Patented Jan. 11, 1938

2,105,111

UNITED STATES PATENT OFFICE 2,105,111

NONSHRINKING WOODLIKE PLASTIC COMPOSITION

Gustavus J. Esselen, Swampscott, Mass., assignor to The A. S. Boyle Company, Cincinnati, Ohio, a corporation of Ohio No Drawing. Application December 23, 1935, Serial No. 55,844

9 Claims. (Cl. 106—40)

My present invention relates to plastic materials which when ready for use are of a doughy putty-like consistency and after drying in the air at room temperatures have in general the qualities and characteristics of wood. Such a material is disclosed in the patent to Griffiths No. 1,838,618, dated December 29, 1931.

The object of the present invention is to provide a material which will be practically non-shrinkable and will not distort during drying and can be manipulated more readily. The material embodying my invention does not stick to the hands and therefore is easy to handle. It is capable of being moulded like clay to any desired form and can be worked for several minutes before it becomes too dry for further modeling. It can be modeled or shaped into considerable masses by a single operation instead of being built up in successive layers each of which requires separate drying. While the material is intended primarily for shaping by hand as putty, or clay are used, this material can also be shaped, pressed or stamped in moulds or dies of metal, wood or plaster of Paris and on account of the nature of the material does not stick to the die or mould. The material is particularly adaptable for use in the manufacture of small articles, substitutes for wooden ornaments and the like. If desired the material in its plastic undried form may be extruded to form a ribbon and then cut into pieces of suitable size which are immediately stamped in dies in a press or if preferred the stamping may be done directly from the ribbon. In either case it is found that very sharp impressions even of fine lines may be obtained, that the material does not stick to the dies and that the articles do not shrink or warp during drying.

The novel material forming the subject matter of the present application is capable of many other uses and the articles prepared as described herein may be painted, lacquered, and treated as ordinary wood. It may be dyed and thus given a uniform artificial color throughout. Articles made from it may be cut, sawn, drilled, chiseled and planed and secured to other articles, to furniture, to cabinets and the like by nails, screws or glue. In general, articles made from this material have the general characteristics of wood but have no grain and therefore do not split. The novel material forming the subject matter of the present application is capable of many other uses.

The following ingredients in the proportions mentioned may be employed:

| Material | Parts by weight |
|---|---|
| Solvent mixture | 46.1 |
| Cellulose derivative (nitrocellulose) | 12.4 |
| Non-drying oil (castor oil) | 3.5 |
| Resinous body (ester gum) | 6.3 |
| Cellulosic filler (wood flour) | 22.2 |
| Non-solvent (benzine) | 9.5 |
| Total | 100.0 |

The solvent volatile liquid mixture referred to in the above table is preferably made up as follows:

| Material | Parts by volume |
|---|---|
| Methyl acetone | 40 |
| Toluol | 40 |
| Ethyl alcohol (C. D. No. 1) | 20 |

The non-solvents employed are non-solvents for the cellulose derivative and may be the aliphatic hydrocarbons obtained from the distillation of petroleum, examples being petroleum ether, benzine, gasoline, V. M. P. naphtha, and Stoddard solvent (specified by the U. S. Bureau of Standards as Commercial Standard 3—28) or water. Of these I prefer to employ 60° benzine. This is a petroleum fraction having a specific gravity of 60° Baumé and boiling between 70° and 90° C. While the above solvents and non-solvents are those which I prefer to use, being the best materials now known to me, undoubtedly other materials may be employed.

The nitrocellulose that ordinarily is used is the material known commercially as film scrap. Other cellulose derivatives, esters and ethers, or their equivalents, or mixtures thereof may be successfully employed. Nitrocellulose is mentioned by way of illustration and because at present it is the preferred ingredient. The filler is finely divided cellulosic material preferably wood flour.

In preparing my new material, the cellulose derivative, i. e. the nitrocellulose, castor oil and ester gum are first dissolved in the solvent mixture and agitated until a uniform solution is produced. The non-solvent is then added slowly in small portions taking care that each portion is thoroughly incorporated in the mixture before the next is added. After the non-solvent has been uniformly distributed through the mixture the wood flour is added in one lot and the stirring is continued until it is all thoroughly wet and evenly distributed throughout the mixture. The material may then be moulded by hand or with the use of tools in the same manner that putty or clay are handled. After moulding, the articles are dried in the air for a suitable length of time. While the drying is ordinarily done at room temperature, it may be carried on in the presence of somewhat higher temperatures, care being taken, however, that the solvent and non-solvent be not removed too rapidly.

While the proportion of non-solvent employed in the preferred formula is 9.5 parts in a 100, more or less may be used, but the non-solvent should not be so much that the cellulose derivative for instance nitro-cellulose will be precipitated. When nitrocellulose is employed in the proportion as indicated in the preferred formula the limit appears to be 12 parts by weight of the non-solvent, e. g., petroleum ether, benzine, gasoline, V. M. P. naptha, and Stoddard solvent or water.

It will also be understood that the proportions of cellulose derivatives, non-drying oil, and gum may be varied somewhat in accordance with the particular uses to which the final product is to be put. Also it will be understood that small quantities of inert fillers may be added when it is desired to give different physical properties or texture to the final product.

While I cannot be entirely certain of the reason that the peculiar composition herein described hardens with practically no shrinkage, I believe it is due partly at least to the fact that the non-solvent tends to precipitate the nitrocellulose after a relatively small proportion of the volatile solvent has evaporated, thus forming a skeleton structure which does not collapse as the major portion of the volatile solvent evaporates.

I claim:

1. A doughy putty-like plastic composition containing a cellulose derivative, a volatile liquid which is a solvent for the cellulose derivative, a liquid which is a non-solvent for the cellulose derivative and a finely divided cellulose filler in such proportion as to harden upon mere exposure to the air to substantially the rigidity and solidity of wood, said non-solvent liquid being present in an amount sufficient to prevent shrinkage of the hardened product and insufficient to precipitate the cellulose derivative from the solution.

2. A doughy putty-like plastic composition containing a cellulose ester, a volatile liquid which is a solvent for the cellulose ester, a liquid which is a non-solvent for cellulose ester, a non-drying oil, and a finely divided cellulose filler in such proportion as to harden upon mere exposure to the air to substantially the rigidity and solidity of wood, said non-solvent liquid being present in an amount sufficient to prevent shrinkage of the hardened product and insufficient to precipitate the cellulose ester from the solution.

3. A doughy putty-like plastic composition containing nitrocellulose, a volatile liquid which is a solvent for the nitrocellulose, a liquid which is a non-solvent for nitrocellulose and a finely divided cellulose filler in such proportion as to harden upon a mere exposure to the air to substantially the rigidity and solidity of wood, said non-solvent liquid being present in an amount sufficient to prevent shrinkage of the hardened product and insufficient to precipitate the nitrocellulose from the solution.

4. A doughy putty-like plastic composition containing a cellulose ester, a volatile liquid which is a solvent for the cellulose ester, an aliphatic hydrocarbon which is a non-solvent for the cellulose ester, a non-drying oil and a finely divided cellulose filler in such proportion as to harden upon mere exposure to the air to substantially the rigidity and solidity of wood, said aliphatic hydrocarbon being present in an amount sufficient to prevent shrinkage of the hardened product and insufficient to precipitate the cellulose ester from the solution.

5. A doughy putty-like plastic composition containing nitrocellulose, a volatile liquid which is a solvent for the nitrocellulose, a liquid which is a non-solvent for nitrocellulose, a non-drying oil, a resinous body and a finely divided cellulose filler in such proportions as to harden upon mere exposure to the air to substantially the rigidity and solidity of wood, said non-solvent liquid being present in an amount sufficient to prevent shrinkage of the hardened product and insufficient to precipitate the nitrocellulose from the solution.

6. A doughy putty-like plastic composition containing nitrocellulose, a volatile liquid which is a solvent for the nitrocellulose benzine and a finely divided cellulose filler in such proportions as to harden upon mere exposure to the air to substantially the rigidity and solidity of wood, said benzine being present in an amount sufficient to prevent shrinkage of the hardened product and insufficient to precipitate the nitrocellulose from the solution.

7. A doughy putty-like plastic composition containing nitrocellulose, a volatile liquid which is a solvent for the nitrocellulose, water and a finely divided cellulose filler in such proportions as to harden upon mere exposure to the air to substantially the solidity and rigidity of wood, the water being present in an amount sufficient to prevent shrinkage of the hardened product and insufficient to precipitate the nitrocellulose from the solution.

8. A doughy putty-like plastic composition containing—

| | Per cent |
|---|---|
| Solvent mixture | about 46 |
| Cellulose derivative (film scrap) | do 12.5 |
| Non-drying oil (castor oil) | do 3.5 |
| Resinous body (ester gum) | do 6. |
| Cellulosic filler (wood flour) | do 22.5 |
| Non-solvent (benzine) | do 9.5 | said non-solvent liquid being present in an amount sufficient to prevent shrinkage of the hardened product and insufficient to precipitate the cellulose derivative from the solution, said material being capable of hardening upon mere exposure to the air to substantially the rigidity and solidity of wood.

9. A doughy putty-like plastic composition containing—

| | Per cent |
|---|---|
| Solvent mixture | about 46.1 |
| Nitrocellulose (film scrap) | do 12.4 |
| Castor oil | do 3.5 |
| Ester gum | do 6.3 |
| Wood flour | do 22.2 |
| Benzine | do 9.5 | said solvent mixture being composed of methyl acetone 40%, toluol 40%, and ethyl alcohol 20%, said non-solvent liquid being present in an amount sufficient to prevent shrinkage of the hardened material and insufficient to precipitate the cellulose derivative from the solution, the composition being capable of hardening upon mere exposure to the air to substantially the rigidity and solidity of wood.

GUSTAVUS J. ESSELEN.